US010158680B2

(12) United States Patent
Herrero

(10) Patent No.: US 10,158,680 B2
(45) Date of Patent: Dec. 18, 2018

(54) CO-TRANSPORTED TUNNELS FOR ENCAPSULATED TRAFFIC

(71) Applicant: Oracle International Corporation, Redwood Shores, CA (US)

(72) Inventor: Rolando Herrero, Derry, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 239 days.

(21) Appl. No.: 15/001,488

(22) Filed: Jan. 20, 2016

(65) Prior Publication Data
US 2017/0208102 A1 Jul. 20, 2017

(51) Int. Cl.
*H04L 29/06* (2006.01)
*H04L 29/08* (2006.01)

(52) U.S. Cl.
CPC ...... *H04L 65/1069* (2013.01); *H04L 65/4007* (2013.01); *H04L 69/322* (2013.01); *H04L 69/325* (2013.01)

(58) Field of Classification Search
CPC ............. H04L 65/4007; H04L 65/1069; H04L 67/1091
USPC .......................................................... 709/227
See application file for complete search history.

(56) References Cited

U.S. PATENT DOCUMENTS

| 7,917,758 | B2* | 3/2011 | Palekar | H04L 63/0428 |
| | | | | 709/227 |
| 8,493,984 | B2* | 7/2013 | Krishnamurthy | H04L 12/66 |
| | | | | 370/252 |
| 2009/0089872 | A1* | 4/2009 | Arkko | H04L 12/2856 |
| | | | | 726/12 |
| 2013/0283037 | A1* | 10/2013 | Katz | H04L 63/04 |
| | | | | 713/151 |
| 2014/0379931 | A1* | 12/2014 | Gaviria | H04L 65/1016 |
| | | | | 709/227 |
| 2015/0039687 | A1* | 2/2015 | Waxman | H04L 67/02 |
| | | | | 709/204 |
| 2016/0301626 | A1* | 10/2016 | Herrero | H04L 12/4633 |

OTHER PUBLICATIONS

H. Schulzrinne et al.; "RTP: A Transport Protocol for Real-Time Applications";Jul. 2003; 89 pages.
3rd Generation Partnership Project; Technical Specification Group Services and System Aspects; Study on firewall traversal (Stage 2) (Release 12); 3GPP TR 33.830 V0. 5.0 (Nov. 2013).

* cited by examiner

*Primary Examiner* — Vivek Srivastava
*Assistant Examiner* — Atta Khan
(74) *Attorney, Agent, or Firm* — Potomac Law Group, PLLC

(57) ABSTRACT

A system establishes tunnels. In response to a first request from an application, the system establishes a first tunnel between a tunneling client of a user equipment ("UE") and a tunneling server and establishes a first outer transport layer and a first outer network layer. In response to a second request from the application, the system establishes a second tunnel between the tunneling client and the tunneling server, where the second request includes a request to use the first outer transport layer and the first outer network layer established in conjunction with the first tunnel.

20 Claims, 6 Drawing Sheets

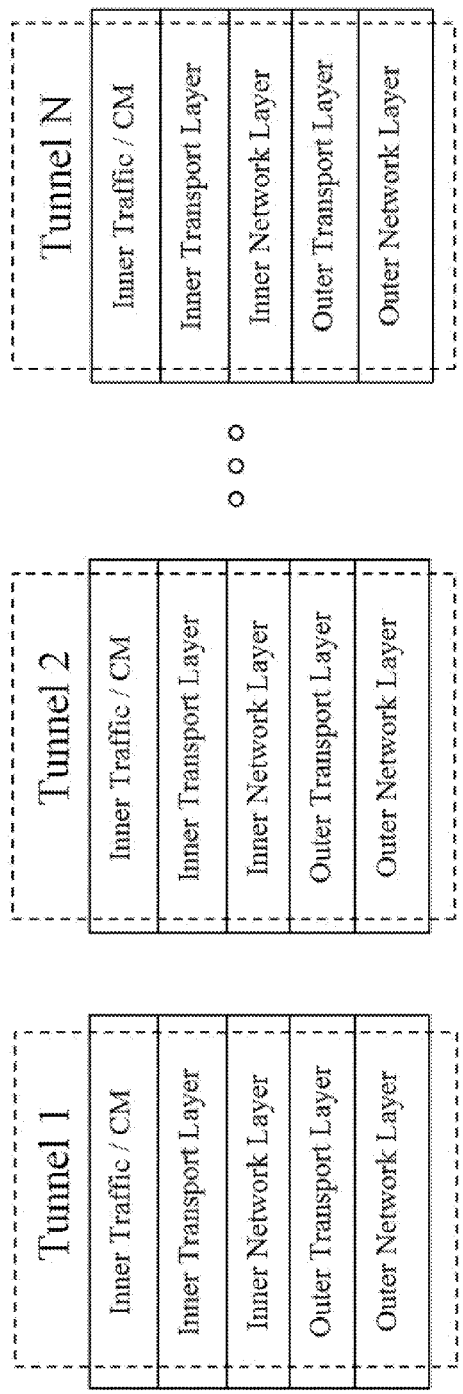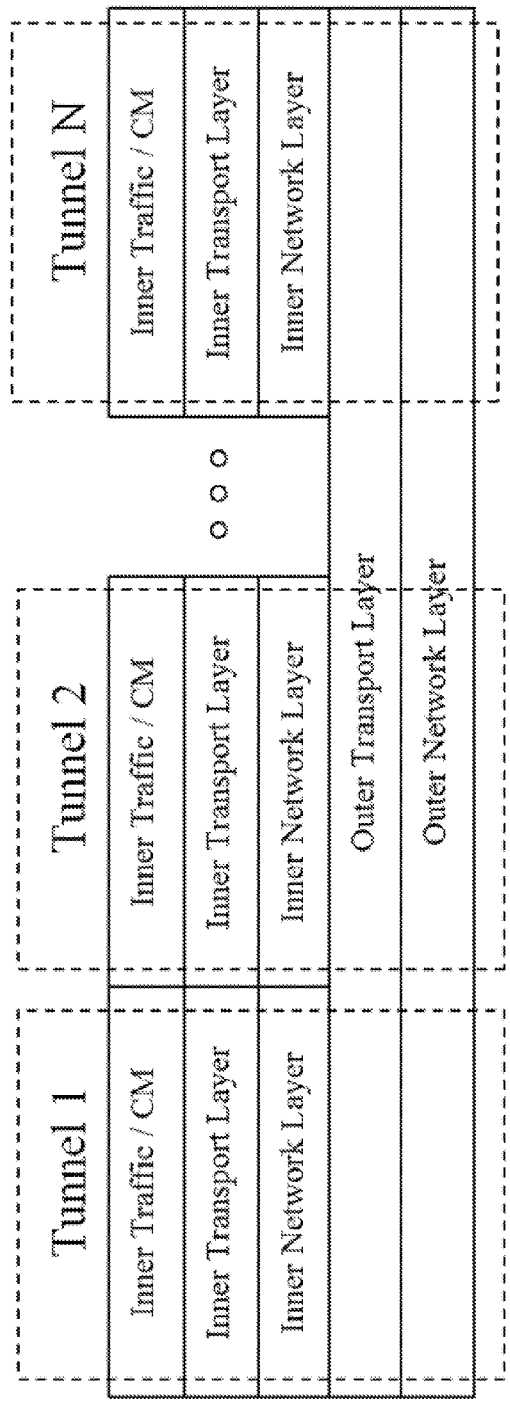
Fig. 4A (Prior Art)
Fig. 4B

US 10,158,680 B2

CO-TRANSPORTED TUNNELS FOR ENCAPSULATED TRAFFIC

FIELD

One embodiment is directed generally to a communications network, and in particular, to the transmission of encapsulated traffic within a tunnel over a communications network.

BACKGROUND INFORMATION

Many enterprise environments have replaced their Public Switched Telephone Network ("PSTN") telephony services with telephony services that use the Internet Protocol ("IP"), commonly known as Voice over IP ("VoIP") or IP Telephony. Since IP Telephony uses an IP network as its backbone, it can provide advanced features such as video conferencing, call recording, and call forwarding.

Recently, the growing base of mobile data subscribers, the wide availability of Internet access, and the high availability of bandwidth in both fixed and mobile networks has resulted in the popularity of advanced services accessed via the Internet (known as Over-the-Top ("OTT") services). This has caused competitive service providers to offer OTT services and hence face corresponding challenges as they implement these new services.

SUMMARY

One embodiment is a system that establishes tunnels. In response to a first request from an application, the system establishes a first tunnel between a tunneling client of a user equipment ("UE") and a tunneling server and establishes a first outer transport layer and a first outer network layer. In response to a second request from the application, the system establishes a second tunnel between the tunneling client and the tunneling server, where the second request includes a request to use the first outer transport layer and the first outer network layer established in conjunction with the first tunnel.

BRIEF DESCRIPTION OF THE DRAWINGS

FIG. 4A illustrates a typical prior art tunnel transport scenario.

FIG. 4B illustrates a tunnel transport scenario in accordance with embodiments of the invention in which only a single outer transport/network layer is used.

DETAILED DESCRIPTION

One embodiment generates a single outer transport and network layer that can accommodate or co-transport encapsulated traffic, transmitted by the same application, traversing two or more tunnels, each normally requiring a separate Internet Protocol ("IP") address and port. The generated outer transport and network layer spans the same client device and tunnel as the co-transported tunnels.

Figure 1:
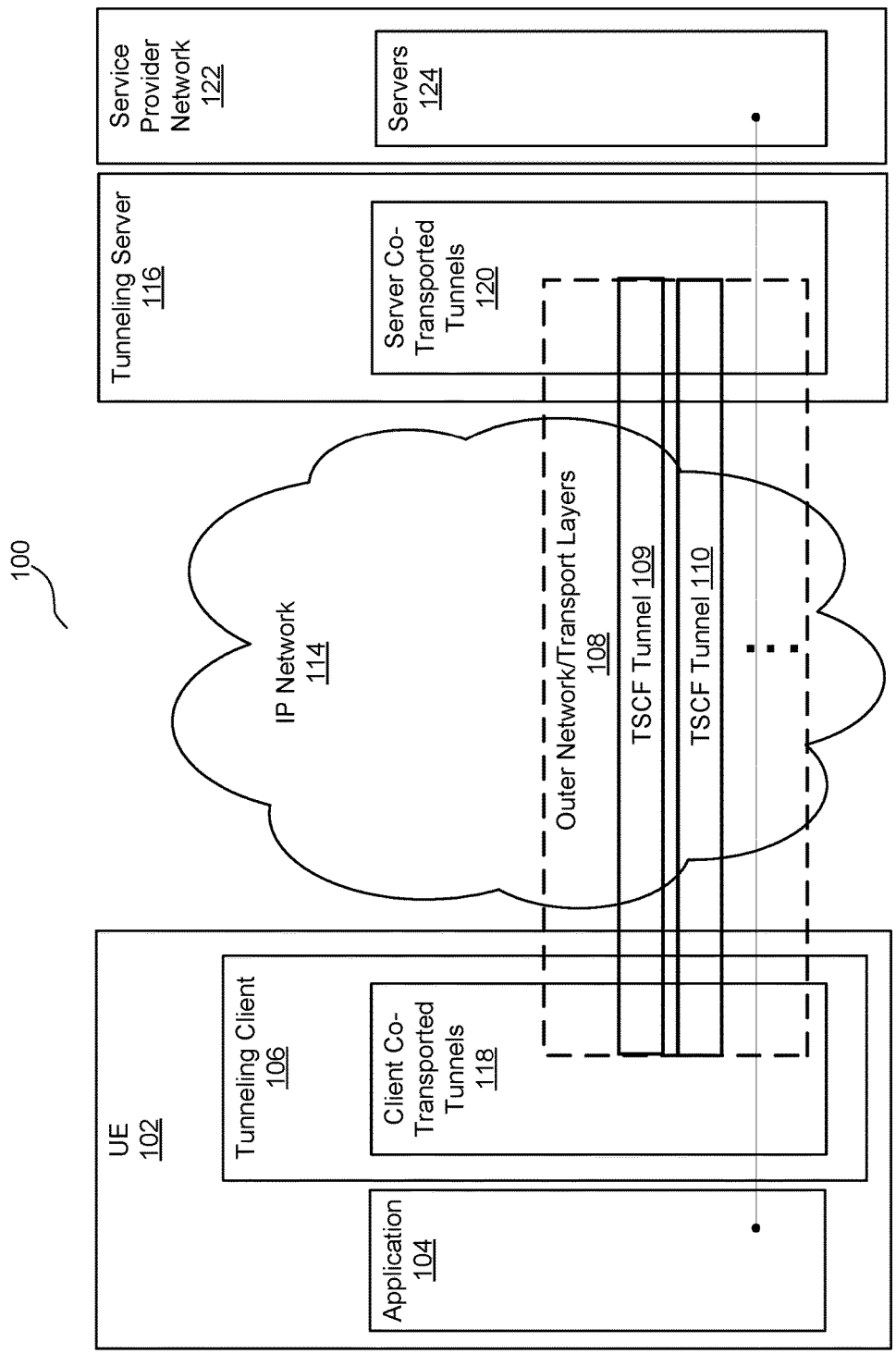
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that performs real-time communications ("RTC") over an Internet Protocol ("IP") network 114 with a service provider network/backbone 122. In RTC, users exchange information instantly or with insignificant latency. Example applications for RTC include voice and/or video calls, application streaming, softphones, and remote desktop applications. UE 102 may be any device used by an end user for communications, such as a smartphone, a laptop computer, a tablet, a television, etc.

In performing RTC, UE 102 communicates signaling and media traffic with respective servers 124 in service provider network 122. Signaling traffic may be communicated according to an application layer protocol such as the Session Initiation Protocol ("SIP"). SIP is configured to be independent of the underlying transport layer. Accordingly, SIP can run on different transport protocols, such as the Transmission Control Protocol ("TCP" as described in, for example, Internet Engineering Task Force ("IETF") request for comments ("RFC") 793 and RFC 675), the User Datagram Protocol ("UDP" as described in, for example, IETF RFC 768), etc.

Network 100 further includes a tunneling server 116 that, together with a tunneling client 106 within UE 102, provides functionality for establishing and managing one or more tunnels for performing RTC according to the Tunneled Services Control Function ("TSCF") standard as described in, for example, 3rd generation partnership program ("3GPP") technical report ("TR") 33.830 V0.5.0, the disclosure of which is hereby incorporated by reference in its entirety. In one embodiment, tunneling client 106 and tunneling server 116 establish one or more TSCF tunnels 109, 110 . . . that are compliant with TSCF tunnel management (e.g., tunnel initialization, maintenance, termination, etc., as defined by, e.g., 3GPP TR 33.830 V0.5.0), and TSCF tunnel transport protocols are supported for the negotiation of TSCF tunnels 109, 110 between tunneling client 106 and tunneling server 116. Further, common outer network/transport layers 108, disclosed in more detail below, provide outer network/transport layers for tunnels 109, 110 and all other TSCF tunnels spanning tunneling client 106 and tunneling server 116.

The TSCF standard provides client side and server side network elements for establishing managed tunnels for performing RTC (e.g., tunneling client 106 and tunneling server 116 in FIG. 1). It also provides two types of outer layer tunneling transports: a stream-based outer layer tunneling transport via TCP or Transport Layer Security ("TLS"), and a datagram-based outer layer tunneling transport via UDP or Datagram Transport Layer Security ("DTLS").

TLS is a cryptographic protocol as provided in, for example, IETF RFC 2246, RFC 4346, RFC 5246, and/or RFC 6176. DTLS is a protocol that provides communications privacy for datagram protocols. TCP and TLS provide reliable, ordered and error-checked delivery of the inner layer traffic, but introduce undesirable latency that is detrimental to RTC applications over a communications network that experiences impairments. On the other hand, UDP and DTLS do not guarantee reliable delivery, thus minimizing latency and being desirable for RTC.

In some embodiments, IP network 114 may include security devices (e.g., firewalls, proxies, etc.) that allow traffic of only a certain transport protocol (e.g., only TCP, only UDP, etc.). Accordingly, tunneling client 106 and tunneling server 116 may establish and manage TSCF tunnels 109, 110 such that UE 102 may use it to traverse such security devices and connect to tunneling server 116 to reach servers 124 in service provider network 122.

The TSCF standard further provides control messages for exchanging configuration information between tunneling client 106 and tunneling server 116. According to the TSCF standard, control messages are of a "request/response" type, and a control message response for a request includes either a corresponding reply or an error code indicating why the request cannot be honored by the receiving end. TSCF control messages use a Type Length Value ("TLV") encoding. TLV is a variable length concatenation of a unique type and a corresponding value.

Each TSCF control message includes a control message ("CM") header at the beginning, including a "CM_Version" field identifying the version of the header and indicating the outer transport protocol of a TSCF tunnel, a "CM_Indication" field identifying whether the message is a control message or not, a "Reserved" field reserved for future use, a "CM_Type" field identifying the type of the control message (e.g., whether it is a request or a response, the corresponding functionality, etc.), a "TLV Count" field indicating the number of TLVs that follow or are appended to the header in the corresponding control message, a "Tunnel Session ID" ("TSID") field including a tunnel session identifier ("ID") assigned by tunneling server 116 to uniquely identify each TSCF tunnel 109, 110, and a "Sequence" field that is incremented per message, as described in, for example, 3GPP TR 33.830 V0.5.0.

In one embodiment, in order to establish TSCF tunnels 109, 110, tunneling client 106 sends a "configuration request" message to tunneling server 116 to obtain configuration information for TSCF tunnels 109, 110. In a "configuration request" message, the TSID header field bits are set to 1 (i.e., FFFF . . . ). In response, tunneling server 116 assigns a TSID to a TSCF tunnel and sends a "configuration response" message back to tunneling client 106. The "configuration response" message includes the TSID assigned by tunneling server 116 to each TSCF tunnel. The subsequent messages between tunneling client 106 and tunneling server 116 include this assigned TSID in their headers that corresponds to the desired traversal tunnel.

In one embodiment, if a control message is communicated between tunneling client 106 and tunneling server 116 and does not include the expected TSID, the control message is dropped and the corresponding TSCF tunnel is terminated. Alternatively, in one embodiment, tunneling client 106 may send a "configuration release request" message to tunneling server 116 to terminate a TSCF tunnel. In response to such a "configuration release request" message, tunneling server 116 sends a "configuration release response" message to tunneling client 106. At this time, the TSCF tunnel is terminated.

In one embodiment, UE 102 executes an application 104 that may be a SIP based RTC application relying on a library such as the software development kit ("SDK") provided by the Tunneled Session Management ("TSM") solution from Oracle Corp. The TSM solution employs a client/server architecture using session border controllers ("SBCs") and client applications, such as application 104, that may be developed using the SDK. The client applications initiate secure communications sessions with the service provider over the Internet. The session border controllers (e.g., implemented by tunneling server 116) at the edge of the network terminate and control the tunnels before passing the secure traffic into the service core of service provider network 122. In one embodiment, SDKs are implemented by a client co-transported tunnels module 118 and/or a server co-transported tunnels module 120. In general, client co-transported tunnels module 118 and/or server co-transported tunnels module 120 provide the functionality of, when initiating TSCF tunnels 109, 110 . . . , provides outer layers 108 for all of the tunnels spanning tunneling client 106 and tunneling server 116, which provides outer network/transport layers for each of tunnels 109, 110. The SDK in general provides additional APIs beyond "standard" TSCF APIs in order to implement the functionality disclosed herein.

Figure 2:
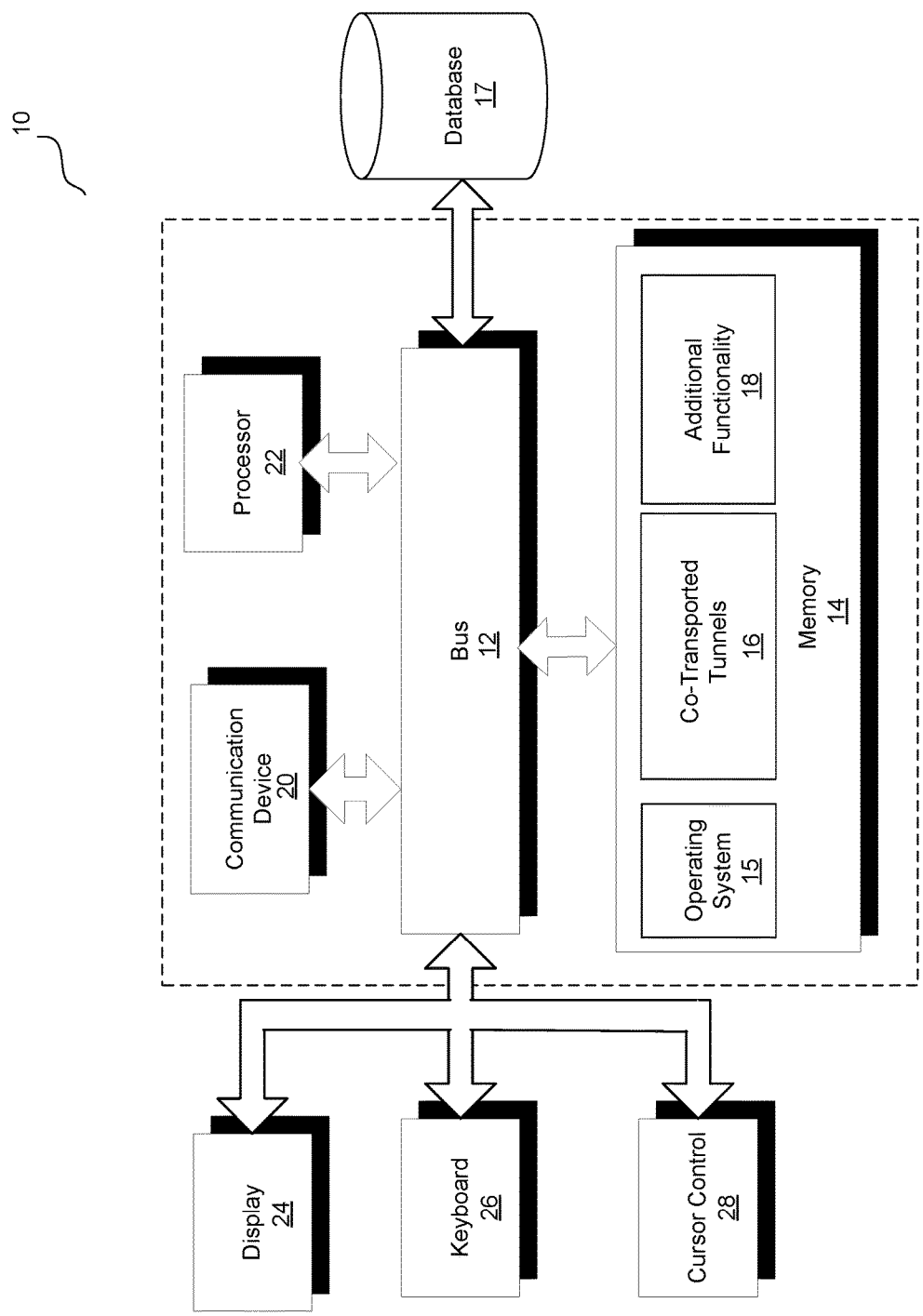
FIG. 2 is a block diagram of a computer server/system in accordance with an embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of tunneling server 116 of FIG. 1, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a co-transported tunnels module 16 for providing co-transported tunnels, and all other functionality disclosed herein. In one example embodiment, co-transported tunnels module 16 may implement tunneling server 116 of FIG. 1 in conjunction with one or more remaining elements of FIG. 2. System 10 can be part of a larger system, such as added functionality to the "Acme Packet 6300" session border controller from Oracle Corp. Therefore, system 10 can include one or more additional functional modules 18 to include the additional functionality. A database 17 is coupled to bus 12 to provide centralized storage for co-transported tunnels module 16 and additional functional modules 18.

Referring again to FIG. 1, with known systems, TSCF tunnels 109, 110 may encapsulate different types of traffic ranging from pure data to real-time media. In general, data and real-time media are subject to different Quality of Service ("QoS") requirements. For example, data may be sensitive to integrity while real-time media may be sensitive to latency. In a tunneling configuration, encapsulated (i.e., in a packet/frame) media is typically communicated according to the real-time transport protocol ("RTP" as provided, for example, in IETF RFC 3550).

Figure 3:
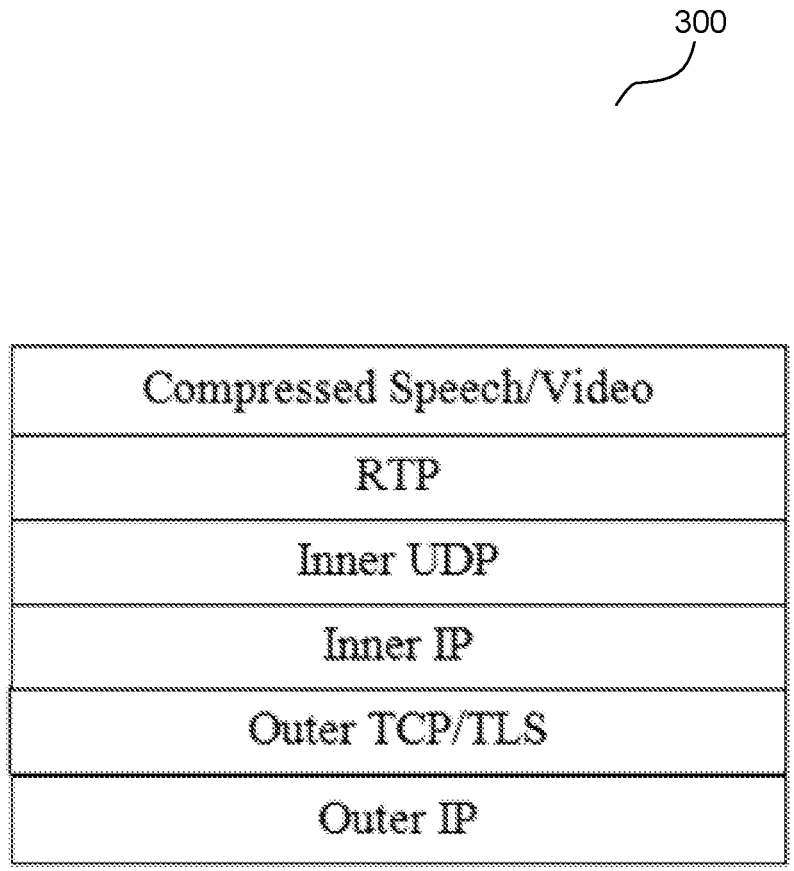
FIG. 3 illustrates example protocol layers in a Tunneled Services Control Function tunneling configuration for encapsulating media traffic according to an embodiment.

In a TSCF tunneling configuration, RTC (e.g., speech, video, etc.) may be subject to two levels of transport: one at the outer tunnel layer typically according to TCP/TLS, and another at the inner tunnel layer typically according to UDP. FIG. 3 illustrates example protocol layers in a TSCF tunneling configuration 300 for encapsulating media traffic according to an embodiment. In TSCF tunneling configuration 300, compressed media (e.g., speech, video, etc.) is communicated according to RTP at the application layer, and is transported via an inner UDP at the inner transport layer within an inner IP at the inner network layer. The inner layers are within an outer TCP/TLS at the outer transport layer which is in turn within an outer IP at the outer network layer. In one embodiment, since most IP networks block any outer traffic that is not stream-based, TCP/TLS is used at the outer transport layer of a TSCF tunnel to guarantee delivery. In embodiments of the present invention, outer layers 108 of FIG. 1 function as the outer transport layer of all TSCF tunnels spanning tunneling client 106 and tunneling server 116 as disclosed in more detail below.

Frequently, as shown in FIG. 1, a single application 104 requires multiple TSCF tunnels to tunneling server 116, each requiring a separate IP address and port. For example, if UE 102 is a smartphone making a video call, it may require two tunnels: one for signaling data to set up the call, and one for transporting the encapsulated media (i.e., speech and video packets). For some applications, hundreds or maybe thousands of simultaneous TSCF tunnels may be required.

However, the availability of transport ports and resources needed for encryption limit the maximum number of tunnels that can be used in load applications (i.e., an application that generates a large amount of traffic (e.g., thousands of tunnels) such as a traffic testing tool). Known solutions incorporate multiple network interfaces connected to the same network, thus increasing the number of available transport ports but also introducing expensive network topology changes and upgrades.

Applications that require multiple tunnels simultaneously transmitting and receiving traffic are limited by two factors: (1) the number of transport ports available for transmission at the client environment, namely the operating system of UE 102; and (2) the available transport and encryption resources needed to allocate incoming tunnels at tunneling server 116. FIG. 4A illustrates a typical prior art tunnel transport scenario. In FIG. 4A, if N tunnels are in use in a single application, each individual tunnel relies on both a set of outer network/transport layers and another set of inner network/transport layers. Typically these tunnel sessions communicate with a single tunnel server (e.g., tunneling server 116 of FIG. 1) in such a way that the outer layers are redundant.

In contrast, embodiments allow for multiple tunnels to rely on a single outer transport layer as opposed to many, which allows the above limits to be avoided and tunnel density to be significantly increased. Embodiments establish co-transported tunnels in order to achieve these results. FIG. 4B illustrates a tunnel transport scenario in accordance with embodiments of the invention in which only a single outer transport/network layer is used. The outer transport layers in both FIGS. 4A and 4B generally include security mechanisms based on the Secure Sockets Layer ("SSL"). Therefore, embodiments reuse the security, transport and network layers of already existing tunnels in order to minimize the use of resources without affecting the transport port availability. Specifically, for multiple TSCF tunnels, only a single IP address and port at server 116 is required with embodiments of the invention, as opposed to an IP address and port for each tunnel.

In one embodiment, client co-transported tunnels module 118 (i.e., a software interface SDK) of FIG. 1 is updated to include a flag or other indicator that enables the creation of co-transported tunnels. If a co-transported tunnel is to be created, a main independent and already existing tunnel is assigned to it beforehand. Upon creation, if no main tunnel is available, a regular independent tunnel is negotiated.

In one embodiment, tunneling client 106 transmits all CM headers and encapsulates inner traffic on top of the transport layer of the main tunnel transport. Tunneling server 116 bi-directionally maps, using the inner IP address, the co-transported tunnel transport to the main tunnel transport. From the point of view of application 104, with the exception of the creation flag, the co-transported tunnels are generally indistinguishable from regular independent tunnels.

Figure 5:
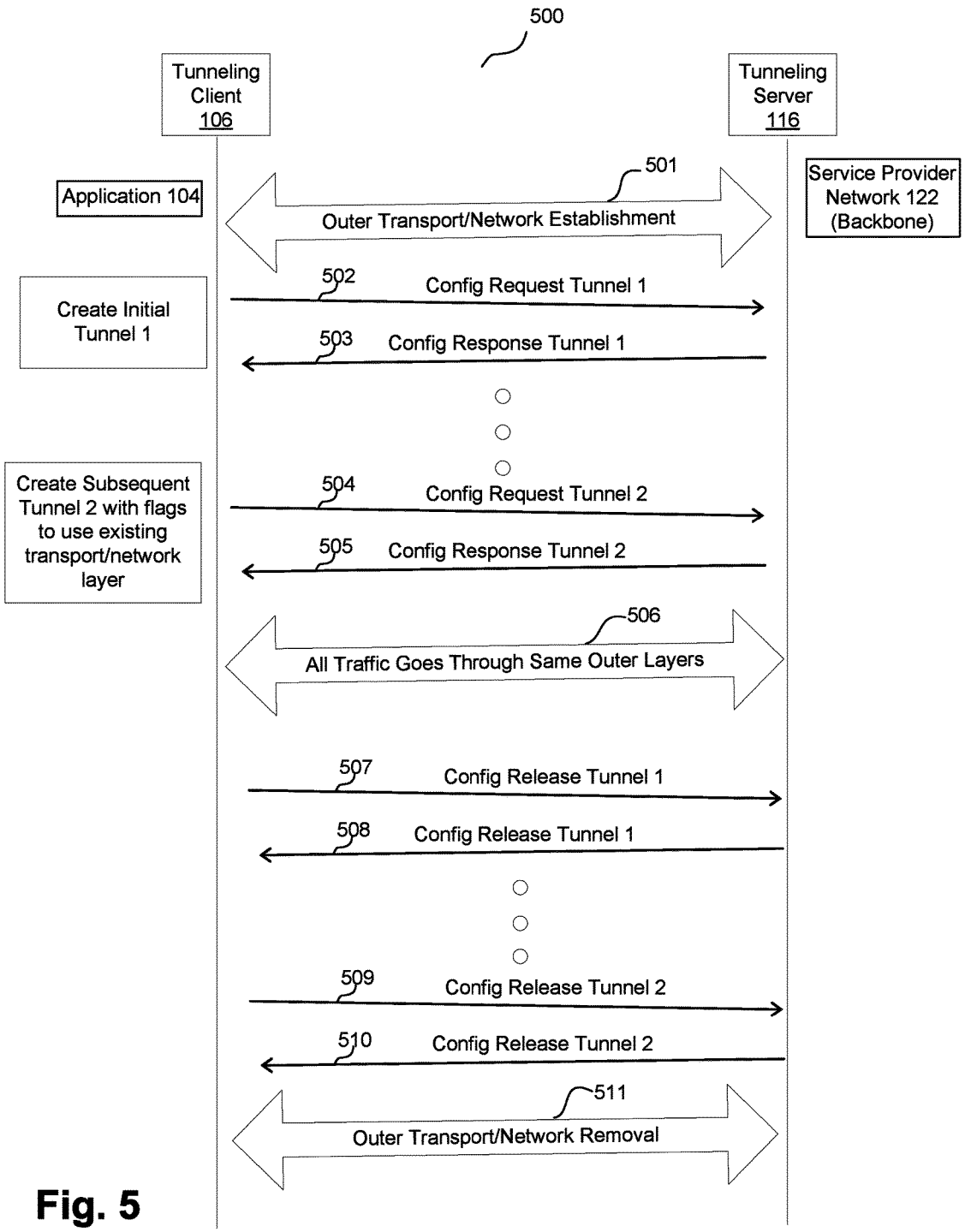
FIG. 5 is an example message sequence diagram, including the sequence of messages exchanged between a tunneling client and a tunneling server, for establishing co-transported tunnels according to some embodiments.

FIG. 5 is an example message sequence diagram 500, including the sequence of messages exchanged between tunneling client 106 and tunneling server 116, for establishing co-transported tunnels according to some embodiments. FIG. 5 includes network elements such as tunneling client 106 in communication with application 104, and tunneling server 116 in communication with service provider network 122, as described herein with reference to FIG. 1.

Initially, application 104 creates a first TSCF tunnel 1 by executing a "tsc_ctrl_new_tunnel" API. At 501, tunneling client 106 establishes a new outer network layer as well as a transport layer. At 502, tunneling client 106 sends a configuration request message to tunneling server 116 to establish TSCF tunnel 1. At 503, tunneling server 116 responds to the configuration request message of tunneling client 106 with a configuration response message. Configuration request and response messages allow for tunneling client 106 to obtain configuration information for the TSCF tunnel from tunneling server 116, as described in, for example, 3GPP TR 33.830 V0.5.0.

Then, application 104 creates a second TSCF tunnel 2, again by executing a "tsc_ctrl_new_tunnel" API. However, the "tsc_ctrl_new_tunnel" API includes flags (e.g., the "New_Tunnel" TLV disclosed below) to request an already existing network and transport layer (i.e., the layers established at 501). At 504, tunneling client 106 issues a tunnel configuration request on top of the tunnel 1 outer network and transport layer. At 505, tunneling server 116 responds to this request with a tunnel configuration response. Any additional tunnels are created in the same manner as tunnel 2, using the same tunnel 1 outer network and transport layer established at 501.

Subsequently, once the tunnels are established, at 506, all inner traffic and CMs to be encapsulated in tunnels 1 and 2 communicate on top of the common outer network and transport layer. From the point of view of application 104, at the inner layer, multiple tunnels will continue to exist.

Upon completing the exchange of request/response messages at 502-505, tunneling client 106 and tunneling server 116 may use the established TSCF tunnels (such as tunnels 109, 110 of FIG. 1) for performing RTC and communicating signaling traffic and media traffic. In one embodiment, when inner signaling and media sockets are needed to place a call (e.g., for communicating SIP call control traffic or RTP media traffic), application 104 creates these sockets on a TSCF tunnel by executing a "tsc_socket" API. A socket is created by determining a socket type (e.g., datagram vs. stream) and a tunnel on which the socket should be created. In one embodiment, when a socket is created, application 104 binds the socket by executing a "tsc_bind" API. The bind function assigns a specific transport port (e.g., TCP or UDP) to the socket. This port is later used as a source port of all traffic generated by the socket. In one embodiment, if an inner socket is created in a TSCF tunnel, there is a binding at tunneling server 116 that links the internal IP address of the TSCF tunnel to that socket.

When both (or all) tunnels are to be removed, at 507 and 509 tunneling client 106 issues individual release requests for each tunnel. At 508 and 510, tunneling server 116 responds with release response CMs. Finally, at 511, tunneling client 106 removes the outer network and transport layers.

One embodiment supports co-transported tunnels establishment by providing a "New_Tunnel" TLV "flag" that, when present, indicates that a new tunnel is requested on top of the outer network and transport layers that is used to send the tunnel configuration request (e.g., at 504 of FIG. 5).

Table 1 below provides an example of the TSCF New_Tunnel TLV for establishing co-transported tunnels according to an embodiment.

In one embodiment, the establishment of co-transported tunnels is requested by application 104 via tsc_socket APIs using an SDK change that includes the addition of a new parameter "transport_source" to the "tsc_requested_config" structure that is passed to the "tsc_new_tunnel" API as indicated by the following example pseudo-code.:

```
typedef struct
{
    tsc_tunnel_id tunnel_id;
    tsc_handle transport_source;
} tsc_requested_config;
where tsc_requested_config is invoked as:
tsc_handle tsc_new_tunnel(tsc_tunnel_params *
tunnel_params, tsc_requested_config *
requested_config).
```

As shown above, if transport_source is NULL, new outer network and transport layers are created when the tunnel is established. Similarly, if transport_source is the handle to a different tunnel, that tunnel's outer network and transport layers are used to set up the new tunnel instead.

One embodiment that is implemented using an SBC, such as the Acme Packet 6300 from Oracle Corp., to allow the co-transported tunnels functionality, provides a keyword "CT" added to the "assigned-services" parameter in the "tscf-interface" configuration object. Table 2 below provides an example of the tscf-interface configuration object according to one embodiment.

TABLE 2

| Parameter Name | Extensible markup language ("XML") tag | Data Type and Default | Value Ranges/Possible Values | Required or Optional (for feature to work)? |
|---|---|---|---|---|
| assigned-services | assigned-services | String: Blank | CT to allow incoming co-transported tunnels. | Optional |

The following functionality provides an example interface configuration for providing the co-transported tunnels functionality according to one embodiment:

```
tscf-interface
    realm-id            access
    state               enabled
    max-tunnels              1000
    local-address-pools pool
    assigned-services        SIP,CT
    tscf-port
        address                172.168.31.1
        port                   2105
```

TABLE 1

| TLV TYPE | | SHORT/ LONG | VALUE | |
|---|---|---|---|---|
| NAME | VALUE SEMANTICS | FORMAT | TYPE | NOTES |
| New_Tunnel | 51 New Tunnel | Short | Boolean | 0 = Request Existent Tunnel 1 = Request New Tunnel |

-continued

```
transport-protocol      TCP
tls-profile
rekey-profile
last-modified-by        admin@console
last-modified-date      2015-08-01 07:00:00
```

The following is an example extensible markup language ("XML") functionality for providing the co-transported tunnels functionality according to one embodiment:

```
<tscfInterface realmID='access'
    state='enabled'
    maxTunnels='1000'
    assignedServices='SIP,CT'
    options=''
    lastModifiedBy='admin@console'
    lastModifiedDate='2015-08-01 07:00:00'
    objectId='59'>
    <key>access</key>
    <localAddressPool name='pool'/>
    <tscfPort address='172.168.31.1'
        port='2105'
        transProtocol='TCP'
        tlsProfile=''
        rekeyProfile=''
</tscfInterface>
```

Figure 6:
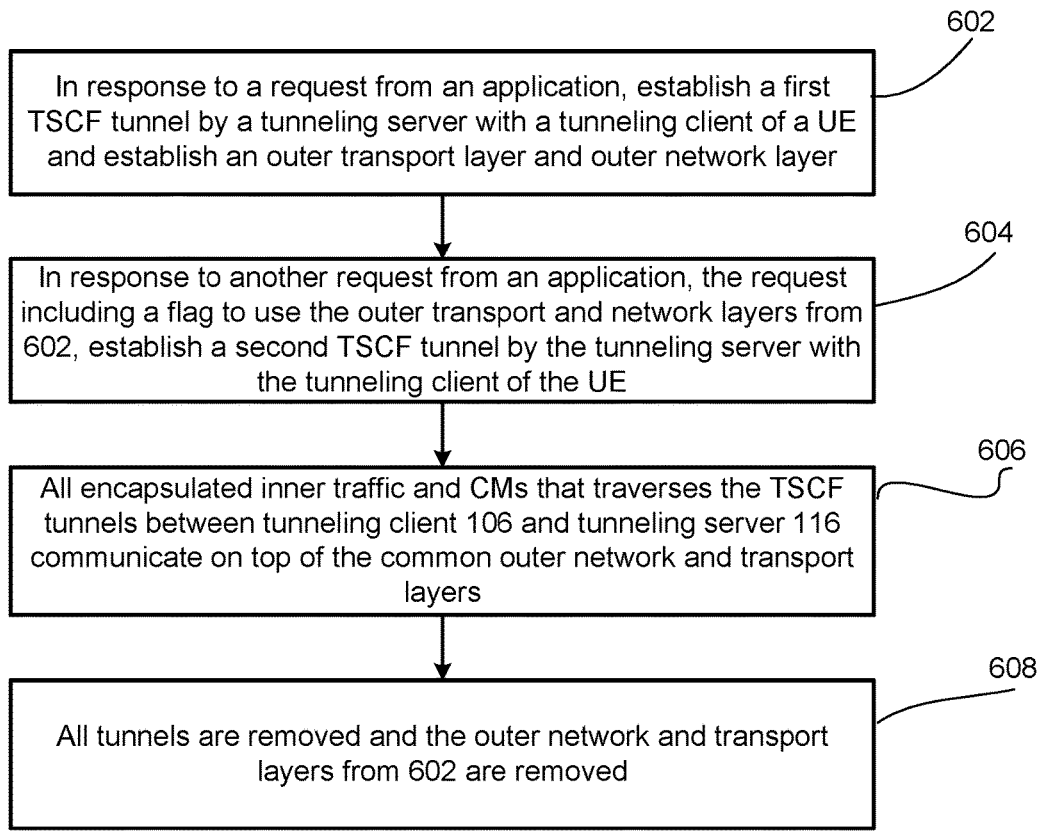
FIG. 6 is a flow diagram of a co-transported tunnels module of FIG. 2 and/or a tunneling client and tunneling server of FIG. 1 when providing co-transported tunnels in accordance with embodiments of the present invention.

FIG. 6 is a flow diagram of co-transported tunnels module 16 of FIG. 2 and/or tunneling client 106 and tunneling server 116 of FIG. 1 when providing co-transported tunnels in accordance with embodiments of the present invention. In one embodiment, the functionality of the flow diagram of FIG. 6 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 602, in response to a request from application 104, tunneling client 106 and tunneling server 116 establish a first TSCF tunnel 109. Tunnel 109 can include multiple inner sockets, such as a separate inner socket for speech data, video data, etc. In conjunction with establishing the first tunnel, an associated outer transport and outer network layer is established. Specifically, outer layers 108 include a network layer (outer IP) and a transport layer (outer UDP/DTLS/TCP/TLS).

At 604, in response to a request from application 104 to establish a second TSCF tunnel 110, tunneling client 106 and tunneling server 116 establish a second TSCF tunnel 109. The request includes a flag to use the outer transport and network layers established at 602 and associated with a first tunnel. Therefore, no outer layers are established when establishing the second TSCF tunnel 110, or any other subsequent tunnels.

At 606, all encapsulated inner traffic and CMs that traverse the TSCF tunnels between tunneling client 106 and tunneling server 116 communicate on top of the common outer network and transport layers.

At 608, in response to a request from application 104, all tunnels are removed and the outer network and transport layers from 602 are removed.

As disclosed, embodiments establish co-transported TSCF tunnels from the same application that utilize a single outer transport and network layer, instead of a separate outer layer for each tunnel. Because embodiments provide for the reuse of security, transport and network layers of already existing tunnels, embodiments do not rely on expensive topology changes or require extra computational resources, thus allowing for better tunnel utilization and efficiency.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to establish tunnels, the establishing comprising:

in response to a first request for a first tunnel from an application, establishing the first tunnel between a tunneling client of a user equipment (UE) and a tunneling server and establishing a first outer transport layer and a first outer network layer, wherein the application is executed on the UE and the first tunnel comprises an associated first inner Internet Protocol (IP) address;

in response to a second request from the application on the UE for a second tunnel, while the first tunnel is established, establishing the second tunnel between the tunneling client and the tunneling server, wherein the second request comprises a request to use the first outer transport layer and the first outer network layer established in conjunction with the first tunnel, wherein the second tunnel comprises an associated second inner IP address that is different than the first inner IP address;

receiving, from the UE on the first tunnel, transmitted first data that is associated at the UE with the first inner IP address; and receiving, from the UE on the second tunnel, transmitted second data associated at the UE with the second inner IP address;

wherein the first tunnel and the second tunnel are configured according to a tunneled services control function (TSCF) standard and both the first tunnel and the second tunnel are associated with the same outer IP address.

2. The computer readable medium of claim 1, wherein a second outer transport layer and a second outer network layer is not established in conjunction with establishing the second tunnel.

3. The computer readable medium of claim 1, wherein encapsulated traffic traverses the second tunnel using the first outer transport layer and the first outer network layer.

4. The computer readable medium of claim 1, wherein the second request includes a request to not establish additional outer transport layers and outer network layers.

5. The computer readable medium of claim 1, wherein the second request comprises a flag for the request to use the first outer transport layer and the first outer network layer established in conjunction with the first tunnel.

6. The computer readable medium of claim 1, wherein the application is a video call, the first data comprises:
signaling data from the UE, and the second data comprises encapsulated media.

7. The computer readable medium of claim 1, wherein the UE comprises a smartphone, and the tunneling server comprises a session border controller.

8. A method of establishing tunnels, the method comprising:
- in response to a first request for a first tunnel from an application, establishing the first tunnel between a tunneling client of a user equipment (UE) and a tunneling server and establishing a first outer transport layer and a first outer network layer, wherein the application is executed on the UE and the first tunnel comprises an associated first inner Internet Protocol (IP) address;
- in response to a second request from the application on the UE for a second tunnel, while the first tunnel is established, establishing the second tunnel between the tunneling client and the tunneling server, wherein the second request comprises a request to use the first outer transport layer and the first outer network layer established in conjunction with the first tunnel, wherein the second tunnel comprises an associated second inner IP address that is different than the first inner IP address;
- receiving, from the UE on the first tunnel, transmitted first data that is associated at the UE with the first inner IP address; and
- receiving, from the UE on the second tunnel, transmitted second data associated at the UE with the second inner IP address;
- wherein the first tunnel and the second tunnel are configured according to a tunneled services control function (TSCF) standard and both the first tunnel and the second tunnel are associated with the same outer IP address.

9. The method of claim 8, wherein a second outer transport layer and a second outer network layer is not established in conjunction with establishing the second tunnel.

10. The method of claim 8, wherein encapsulated traffic traverses the second tunnel using the first outer transport layer and the first outer network layer.

11. The method of claim 8, wherein the second request includes a request to not establish additional outer transport layers and outer network layers.

12. The method of claim 8, wherein the second request comprises a flag for the request to use the first outer transport layer and the first outer network layer established in conjunction with the first tunnel.

13. The method of claim 8, wherein the application is a video call, the first data comprises:
- signaling data and the second data comprises encapsulated media.

14. The method of claim 8, wherein the UE comprises a smartphone, and the tunneling server comprises a session border controller.

15. A tunneling server comprising:
- a processor; and
- a storage device coupled to the processor that stores instructions that cause the processor to establish tunnels, the establishing comprising:
- in response to a first request for a first tunnel from an application, establishing the first tunnel between a tunneling client of a user equipment (UE) and the tunneling server and establishing a first outer transport layer and a first outer network layer, wherein the application is executed on the UE and the first tunnel comprises an associated first inner Internet Protocol (IP) address;
- in response to a second request from the application on the UE for a second tunnel, while the first tunnel is established, establishing the second tunnel between the tunneling client and the tunneling server, wherein the second request comprises a request to use the first outer transport layer and the first outer network layer established in conjunction with the first tunnel, wherein the second tunnel comprises an associated second inner IP address that is different than the first inner IP address;
- receiving, from the UE on the first tunnel, transmitted first data that is associated at the UE with the first inner IP address; and
- receiving, from the UE on the second tunnel, transmitted second data associated at the UE with the second inner IP address;
- wherein the first tunnel and the second tunnel are configured according to a tunneled services control function (TSCF) standard and both the first tunnel and the second tunnel are associated with the same outer IP address.

16. The tunneling server of claim 15, wherein a second outer transport layer and a second outer network layer is not established in conjunction with establishing the second tunnel.

17. The tunneling server of claim 15, wherein encapsulated traffic traverses the second tunnel using the first outer transport layer and the first outer network layer.

18. The tunneling server of claim 15, wherein the second request includes a request to not establish additional outer transport layers and outer network layers.

19. The tunneling server of claim 15, wherein the second request comprises a flag for the request to use the first outer transport layer and the first outer network layer established in conjunction with the first tunnel.

20. The tunneling server of claim 15, wherein the application is a video call, the first data comprises:
- signaling data and the second data comprises encapsulated media.

* * * * *

UNITED STATES PATENT AND TRADEMARK OFFICE
CERTIFICATE OF CORRECTION

PATENT NO. : 10,158,680 B2
APPLICATION NO. : 15/001488
DATED : December 18, 2018
INVENTOR(S) : Herrero Page 1 of 1

It is certified that error appears in the above-identified patent and that said Letters Patent is hereby corrected as shown below:

In the Claims

In Column 10, Line 62, in Claim 6, delete "comprises:" and insert -- comprises --, therefor.

In Column 10, Line 63, in Claim 6, after "signaling data" delete "from the UE,".

In Column 11, Line 46, in Claim 13, delete "comprises:" and insert -- comprises --, therefor.

In Column 12, Line 48, in Claim 20, delete "comprises:" and insert -- comprises --, therefor.

Signed and Sealed this
Twenty-first Day of January, 2020

Andrei Iancu
*Director of the United States Patent and Trademark Office*